(12) United States Patent
Wu et al.

(10) Patent No.: US 8,810,962 B2
(45) Date of Patent: Aug. 19, 2014

(54) INSERTION UNDER READ SHIELD FOR IMPROVED READ GAP ACTUATION IN DYNAMIC FLYING HEIGHT

(75) Inventors: Yan Wu, Cupertino, CA (US); Kowang Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 775 days.

(21) Appl. No.: 12/455,758

(22) Filed: Jun. 5, 2009

(65) Prior Publication Data
US 2010/0309581 A1 Dec. 9, 2010

(51) Int. Cl.
*G11B 5/10* (2006.01)
*G11B 5/31* (2006.01)
*G11B 5/60* (2006.01)
*G11B 5/127* (2006.01)

(52) U.S. Cl.
CPC ............ *G11B 5/3133* (2013.01); *G11B 5/3116* (2013.01); *G11B 5/6005* (2013.01); *G11B 5/6064* (2013.01); *G11B 5/1278* (2013.01)
USPC .................. 360/123.12; G9B/5.034; 428/816

(58) Field of Classification Search
None
See application file for complete search history.

(56) References Cited

U.S. PATENT DOCUMENTS

| | | | |
|---|---|---|---|
| 5,811,018 A | | 9/1998 | Ewasko et al. |
| 6,700,752 B2 | | 3/2004 | Dimitrov et al. |
| 7,164,555 B2 | * | 1/2007 | Kato et al. ............... 360/128 |
| 7,199,982 B2 | * | 4/2007 | Suk ............................. 360/294.7 |
| 7,239,481 B2 | * | 7/2007 | Lille et al. ................ 360/125.31 |
| 7,428,124 B1 | * | 9/2008 | Song et al. ..................... 360/128 |
| 7,724,471 B2 | * | 5/2010 | Sakamoto et al. ............. 360/128 |
| 2006/0034013 A1 | * | 2/2006 | Kato et al. ..................... 360/128 |
| 2009/0251828 A1 | * | 10/2009 | Schreck et al. ............... 360/319 |
| 2009/0323227 A1 | * | 12/2009 | Zheng et al. .................. 360/313 |
| 2010/0002327 A1 | * | 1/2010 | Call et al. ........................ 360/31 |

OTHER PUBLICATIONS

Co-pending U.S. Appl. No. 10/080,276, filed Apr. 2, 2008, "Vertically Stacked DFH Heater Design for Protrusion Shape Control," assigned to the same assignee as the present invention.

* cited by examiner

*Primary Examiner* — Kevin Bernatz
(74) *Attorney, Agent, or Firm* — Saile Ackerman LLC; Stephen B. Ackerman

(57) ABSTRACT

A read/write head is disclosed wherein a non-magnetic layer made of a metal is inserted in the read head on a side opposite to the S1 shield with respect to the sensor. The non-magnetic layer is preferably Cu and is recessed from the ABS to prevent corrosion. A preferred design has a 1 to 5 micron thick non-magnetic insertion layer that extends a distance of 3 to 100 microns along a plane that is perpendicular to the ABS. RG efficiency is enhanced significantly and RG gamma ratio is improved to 1.0 so that a smaller difference in RG, WG, and min-fly point can be achieved at touchdown detection and in normal read/write operations. These results lead to an optimal dynamic performance for a given spacing target and enhanced read gap protrusion at a given heater power. S1/S2A thickness can be independently optimized for magnetic performance consideration only.

9 Claims, 4 Drawing Sheets

US 8,810,962 B2

INSERTION UNDER READ SHIELD FOR IMPROVED READ GAP ACTUATION IN DYNAMIC FLYING HEIGHT

RELATED PATENT APPLICATION

This application is related to the following: Ser. No. 12/080,276, filing date Apr. 2, 2008; assigned to a common assignee, and herein incorporated by reference in its entirety.

FIELD OF THE INVENTION

The invention relates to the insertion of a non-magnetic layer with a high coefficient of thermal expansion (CTE) and high thermal conductivity below the first shield (S1) layer in a read head to enhance read gap (RG) protrusion at the same power, provide a better RG gamma parameter, and serve as a superior heat sink for improved write current (Iw) driven protrusion.

BACKGROUND OF THE INVENTION

Perpendicular recording has been developed in part to achieve higher recording density than is realized with longitudinal recording devices. A PMR write head typically has a main pole layer with a small surface area at an air bearing surface (ABS) and coils that conduct a current and generate a magnetic flux in the main pole that exits through a write pole tip and enters a magnetic media (disk) adjacent to the ABS. The flux may return through a shield structure to the back gap region which connects the main pole with the shield structure. There is typically one or more write shields on the write gap layer above the main pole and along the ABS and an upper section of the shield structure which may have an arched shape is formed over the coil layer and connects the one or more write shield sections along the ABS to the back gap region.

Perpendicular magnetic recording has become the mainstream technology for disk drive applications beyond 150 Gbit/in$^2$. The demand for improved performance drives the need for a higher areal density which in turn calls for a continuous reduction in transducer size. A PMR head which combines the features of a single pole writer and a double layered media (magnetic disk) has a great advantage over LMR in providing higher write field, better read back signal, and potentially much higher areal density. Typically, today's magnetic head consists of a writer and a reader as separate elements that are formed adjacent to one another along an ABS. The read head may be based on a TMR element in which a tunnel barrier layer separates two ferromagnetic (FM) layers where a first FM layer has a fixed magnetization direction and the second FM layer has a magnetic moment that is free to rotate about a direction orthogonal to the direction of the magnetic moment in the reference "fixed" layer. The resistance across the barrier changes as the free layer moment is rotated. This signal is used to detect the small magnetic field from the recorded magnetization pattern on the media.

Reducing the magnetic spacing from read/write heads to the magnetic media during both writing and reading is the most important factor in achieving better performance in high density recording. The writer and reader are separated by several microns in a typical recording head and are made of several different materials each having a unique CTE. Therefore, the protrusion of the reader and writer are usually quite different due to the effect of varying operating temperatures, applying dynamic flying height (DFH) power to actuate the reader or writer, or from write current excitation. In addition, the point with minimum spacing to disk could be located away from either the reader or the writer, imposing further restrictions to achievable magnetic spacing during reading and writing. Improvements in PMR head design are needed to control the protrusion differences at the writer, the reader and the minimum point, and its variation. In particular, for the touch down and then back off mode of operation using DFH, if the writer protrusion is much more than the reader protrusion, then the minimum reader spacing is determined by the excess protrusion plus any initial protrusion. The ratio of reader protrusion rate/writer protrusion rate is called the gamma ratio. A lower gamma ratio means the writer protrusion rate is much higher than the reader protrusion rate, and could potentially put a greater limit to achievable reader spacing.

An important head design objective is to achieve a gamma ratio as close as possible to 1 which is ideal for tribology and magnetic performance since it keeps the gap between reader and writer at a constant value independent of the DFH power used for actuation. From a drive reliability point of view, the reader should not be at the minfly point which is the mechanically closest part of the head to the disk because the read sensor is more sensitive to mechanical impact. But the additional spacing margin for the reader needs to be kept to as small a number as reliability allows in order to have the best read back performance possible.

Typically, this "dynamic" control of spacing involves a thin layer of heater film that is embedded inside the magnetic recording head. The joule heating from the electrical current into the heater film is conducted away from the source to the entire slider body and the air bearing surface (ABS) elastically deforms so the read gap (RG) and write gap (WG) of the recording head become closer to the recording media (disk).

The recent advancement of the touchdown detection scheme when the recording head touches the disk makes it possible to control the spacing accurately to well within a nanometer. Particular interest is focused on the differential protrusion rate of RG, WG, and the minimum flying point (MIN). Improvement of the gamma parameter for RG (RG protrusion rate/MIN protrusion rate) as well as the gamma parameter for WG is critical to the overall performance in resolution, signal-to-noise ratio (SNR) and bit error rate (BER).

A common way to increase the RG actuation during DFH operation is to increase the lower read shield (S1) thickness. The increased volume of the S1 enables the RG to protrude more at the same power, thus improving the RG gamma parameter and dynamic performance (DP). The thickness of the upper read shield (S2A) is part of the contribution to reader-writer separation which is desired to be as small as possible in order to have high format efficiency in the drive. With the increased imbalance of the S1 and S2A thickness resulting from a thicker S1, certain drawbacks in magnetic characteristics associated with the read shield thickness ratio create undesirable transfer curves for the reader. One drawback is an increased hysteresis reject rate during quasi-static (QST) testing. In addition, a thicker S1 reduces the QST amplitude for a fixed field span testing. This indirectly impacts QST based noise testing such as PAT (proportional amplitude testing). Although this issue can be addressed in principle by new testing conditions, significant investment would be required for appropriate tester upgrades. Thus, an alternative to a thicker S1 layer is desirable in order to improve RG actuation without adversely compromising other read head characteristics.

A search of the prior art revealed the following references that relate to read gap modification.

U.S. Pat. No. 6,700,752 describes a thermally conducting non-magnetic layer that is inserted in a read gap and adjoins a surface of the S1 shield that faces the sensor. The inserted layer reduces thermal resistance between the read sensor and nearby shield thereby allowing more power to be dissipated without overheating.

U.S. Pat. No. 5,811,018 discloses an interleaved magnetic head to control read gap thickness. A protective layer adjacent to the S2 shield is used to reduce the cost of the interleaved head and allows improved control of the read gap thickness.

In related patent application Ser. No. 12/080,276, a dual heater scheme is disclosed and is used to optimize the gamma ratio by independently controlling read gap protrusion and write gap protrusion.

SUMMARY OF THE INVENTION

One objective of the present invention is to provide a read head configuration that will enable a more efficient read gap (RG) actuation such that a larger RG protrusion is achieved at the same power level compared with prior art read head structures.

Another objective of the present invention is to provide a read head configuration according to the first objective without exposing any metal layer at the ABS that could lead to a corrosion concern.

According to the present invention, these objectives are realized in an embodiment where a read head is formed on a substrate and has an air bearing surface (ABS) along a plane that is essentially perpendicular to the substrate. The read head has an insulation layer formed on the substrate. A key feature is that a non-magnetic layer with a thickness of 1 to 3 microns and having a high CTE and high conductivity is formed within an insulation layer below the bottom (S1) shield in the read head structure. The non-magnetic insertion layer is made of a dielectric material or a metal and is recessed from the ABS by a distance of about 0.3 to 3 microns, and has a length of 1 to 100 microns along an axis which is perpendicular to the ABS. Above the insertion layer is sequentially formed a S1 shield, a gap layer having a sensor element formed therein along the ABS, an S2A shield, a second insulation layer, and a S2B shield to complete the read head. The S2B shield may also serve as a return pole in an overlying write head.

The insertion layer below the S1 shield is non-magnetic so as not to change the preferred S1 thickness and thereby avoid having an adverse magnetic effect as discussed previously regarding the consequences of a thicker S1 shield. The high CTE enhances the RG protrusion (at the same power into the heater element) which is equivalent to higher RG protrusion efficiency. Preferably, the insertion layer has high thermal conductivity in order to act as a superior heat sink to enable improved write current (Iw) driven protrusion. The volume of the non-magnetic insertion layer is limited so that the heat sink capacity does not reduce excessively the dynamic fly heating (DFH) temperature rise compared to when no non-magnetic insertion layer is present.

The present invention also includes a method for forming the novel insertion layer. Once the first insulation layer is laid down on the substrate, an opening may be formed in the first insulation layer by a standard photoresist patterning and etching sequence. In an embodiment wherein the non-magnetic insertion layer is comprised of a metal such as Cu, the metal layer may be electroplated or sputter deposited in the opening followed by a chemical mechanical polish (CMP) process to make the metal layer coplanar with the surrounding first insulation layer. Alternatively, a seed layer may be formed in the opening before the Cu layer is deposited and planarized. Thereafter, an S1 shield may be deposited on the first insulation layer and non-magnetic insertion layer. The remainder of the read head and overlying write head may be formed by conventional methods. In one embodiment, a cover layer comprised of SiC is formed in an overcoat layer at the top of the write head.

DETAILED DESCRIPTION OF THE INVENTION

The present invention relates to a non-magnetic insertion layer that is formed in a read head on an opposite side of the S1 shield with respect to the sensor element and a method for making the same. Although a read/write head is depicted with an overcoat layer and a SiC cover layer in the exemplary embodiments, the present invention encompasses other recording head configurations as appreciated by those skilled in the art. The drawings are provided by way of example and are not intended to limit the scope of the invention.

Figure 1:
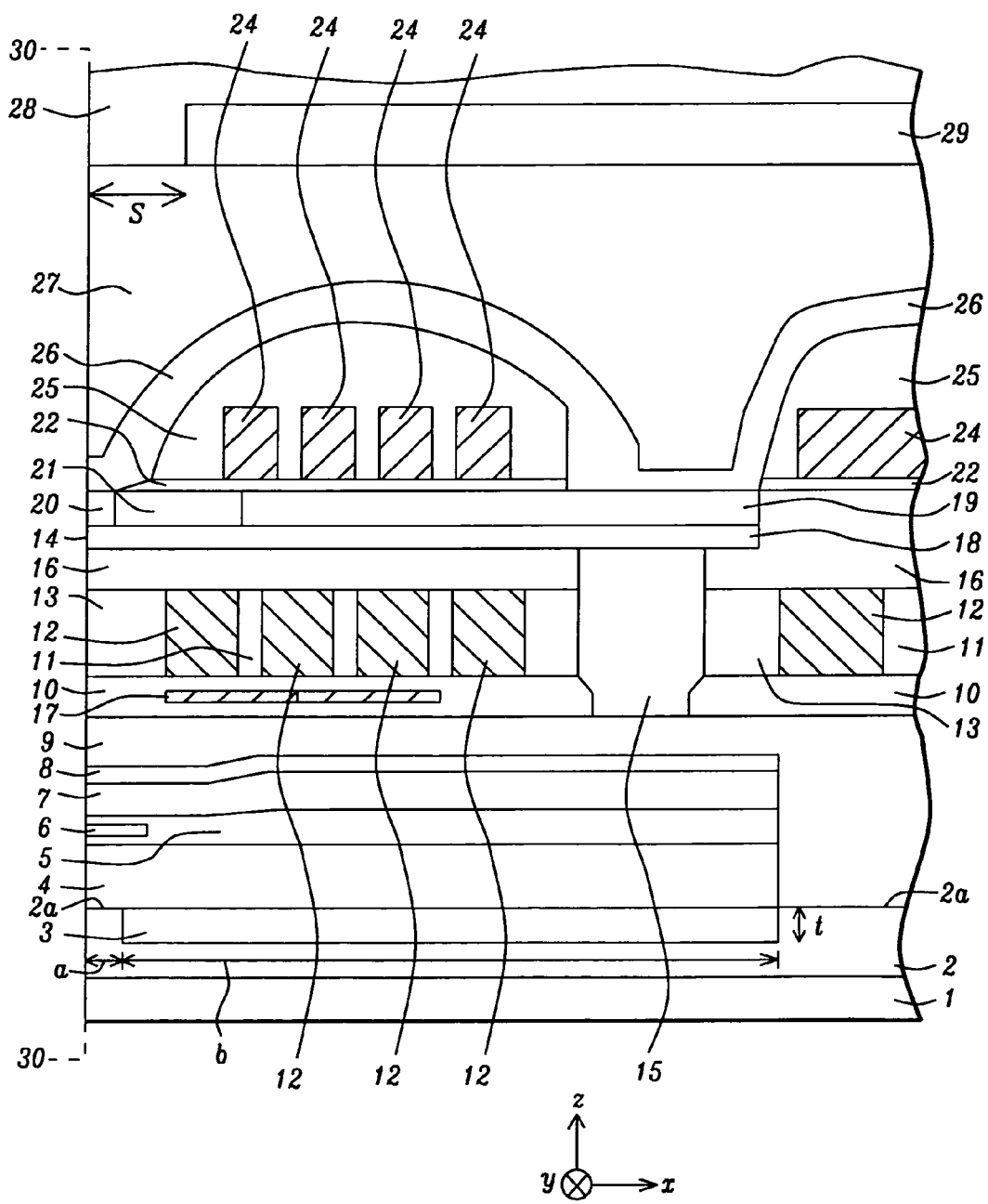
FIG. 1 is a cross-sectional view showing a read/write head with a non-magnetic insertion layer between the first insulation layer and S1 shield in the read head according to one embodiment of the present invention.

Referring to FIG. 1, one embodiment of a recording head of the present invention is depicted in a cross-sectional view from a plane orthogonal to an air bearing surface (ABS) 30-30. The read/write head is formed on a substrate 1 that may be comprised of AlTiC (alumina+TiC). The substrate 1 is typically part of a slider (not shown) formed in an array of sliders on a wafer. After the read/write head is completed, the wafer is sliced to form rows of sliders. Each row is typically lapped to afford an ABS before dicing to fabricate individual sliders that are used in a magnetic recording device. An insulation layer 2 is disposed on the AlTiC substrate 1 and may be made of a dielectric material such as alumina.

A non-magnetic insertion layer 3 is formed in the insulation layer 2 and is preferably coplanar with the top surface 2a of the insulation layer. The non-magnetic insertion layer 3 may be comprised of a metal such as Cu or a Cu alloy, and has a thickness t between 1 and 5 microns. Preferably, the non-magnetic insertion layer 3 is recessed a distance a of about 0.3 to 10 microns from the ABS 30-30 and has a length b of 1 to 100 microns along the x-axis direction which is perpendicular to the ABS. The non-magnetic insertion layer 3 is recessed from the ABS to prevent exposure of a metal layer such as Cu that could lead to corrosion and to avoid unwanted local protrusion after backend lapping and reactive ion etch (RIE) processes. The non-magnetic insertion layer 3 has a high CTE that is preferably greater than the CTE of alumina. During heating provided by a heater 17, for example, the non-magnetic layer insertion layer expands along with other read head layers and effectively pushes the overlying sensor 6 towards the magnetic medium (not shown) that is typically a few nanometers away from the ABS 30-30. The heating and expansion process causes read gap (RG) protrusion toward the magnetic medium and must be controlled to prevent damage to the sensor 6 and read head.

It should be understood that a heating element such as a resistive heater 17 may be positioned in the read/write head at a location such as in insulation layer 10 between the S2B shield 9 and the bucking coil layer 12. In another embodiment, a resistive heater may be formed within insulation layer 2, insulation layer 8, or within gap layer 5, for example. The heater 17 is a resistor and when power is applied from a power source, the heater heats up the surrounding layers and leads to thermal protrusion to provide dynamic fly height (DFH) control. In other words, the amount of power supplied to the heater controls RG protrusion and typically affects write gap (WG) protrusion as well. One advantage of a non-magnetic insertion layer 3 as described herein is that RG protrusion can be tuned by the size and thermal/mechanical property of the insertion layer such that the gamma ratio (WG protrusion rate/RG protrusion rate) is closer to 1. This tuning can be done after the optimization of the magnetic layers for magnetic performance such as QST yield as it will not impact the magnetic performance. The present invention can be further extended to include more than one heater formed in the read/write head as disclosed in related patent application Ser. No. 12/080,276.

The non-magnetic insertion layer 3 preferably has a high thermal conductivity compared with alumina in order to serve as a superior heat sink for improved write current (Iw) driven protrusion. At the same time, non-magnetic insertion layer 3 could help to equalize the protrusion at WG and RG during writing.

The bottom shield 4 is also referred to as the S1 shield and may be comprised of NiFe, for example. A read gap 5 is formed between the S1 shield 4 and S2A shield 7. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an anti-parallel fashion. The non-magnetic layer in the sensor 6 may be Cu in a giant magnetoresistive (GMR) sensor or may be comprised of an insulator such as alumina or MgO in a tunneling magnetoresistive (TMR) sensor.

A first top shield (S2A) layer 7, insulation layer 8, and second top shield (S2B) layer 9 are formed sequentially on the read gap 5. Top shield layers 7, 9 may be made of the same magnetic material as in the S1 shield 4 and insulation layer 8 may be the same dielectric material as in insulation layer 2. Those skilled in the art will recognize that layers 2-9 represent the read head portion of the read/write head and layers 9-27 represent the write head portion. Note that the S2B layer 9 may serve as a flux return pole in the write head portion of the read/write head.

The present invention anticipates that various configurations of a write head may be employed with the read head portion. In the exemplary embodiment, there is a first section of an insulation layer 10 formed on the S2B shield layer 9 and between the ABS 30-30 and a back gap connection 15. Note that the insulation layer 10 has a second section that adjoins the back gap connection along a side opposite the first section. A heater 17 that is preferably recessed from the ABS 30-30 may be formed in insulation layer 10. A bucking coil layer 12 is disposed on the insulation layer 10 and is shown with four turns between the back gap connection 15 and ABS 30-30 that are separated from each other by an insulation layer 11 comprised of a photoresist material. The portion of bucking coil layer 12 closest to the ABS 30-30 is coplanar with an insulation layer 13 that is formed along the ABS. The top surfaces of insulation layers 11, 13 and bucking coil layer 12 are coplanar in this embodiment. Insulation layers 10, 11, 13 are comprised of a dielectric layer and bucking coil layer is typically a conductive material such as Cu. The back gap connection 15 may be made of CoFeNi or the like and magnetically couples the main pole layer 18 to the S2B shield layer 9 that serves as a flux return pole.

An insulation layer 16 is formed on insulation layers 11, 13 and on bucking coil layer 12 and a first section extends from the ABS 30-30 to the back gap connection 15. Both of the insulation layers 11, 16 have a second section on the opposite side of the back gap connection 15 with respect to the ABS. Above the insulation layer 16 is a main pole layer 18 that may be comprised of CoFeNi or another magnetic material. Main pole layer 18 has a pole tip 14 at the ABS 30-30 and extends toward the back end of the device with a sufficient length to connect with back gap connection 15. A first write shield layer 20 is disposed on the main pole layer 18 at the ABS and extends a throat height distance (not shown) away from the ABS 30-30 to connect with a non-magnetic layer 21. The first write shield layer 20 may be made of CoFeN, CoFeNi, NiFe, or CoFe, for example, and is coplanar with the non-magnetic layer 21 and a yoke 19 which is formed on the main pole layer 18 and serves to concentrate magnetic flux at the write pole tip 14. There is an insulation layer 22 formed on a portion of the non-magnetic layer 21 and yoke 19. Magnetic flux in the yoke 19 is generated by passing a current through the main coil layer 24 that is disposed on the insulation layer 22. The main coil layer 24 has a plurality of turns but only four turns are depicted in the drawing.

There is a second shield layer 26 formed on the first shield layer 21 along the ABS and which arches over the main coil layer 24 and connects with the top surface of the yoke 19 in a region overlying the back gap connection 15. An insulation layer 25 is formed on the insulation layer 22 and fills the openings between the turns of the main coil layer 24 and the space between the main coil layer and the arched second shield layer 26. A protection layer 27 covers the second shield layer 26 and is made of an insulating material such as alumina. Above the protection layer 27 and recessed a certain distance from the ABS 30-30 is a cover layer 29 that is preferably comprised of a low CTE material like SiC and serves to reduce the WG protrusion rate. The SiC cover layer 29 is recessed to avoid introducing a material at the ABS with different mechanical and etch resistance properties than adjacent layers which could adversely affect back end lapping and ion beam etching processes. An overcoat layer 28 is formed between the SiC cover layer 29 and ABS 30-30 and on the top surface of the SiC layer.

Figure 2:
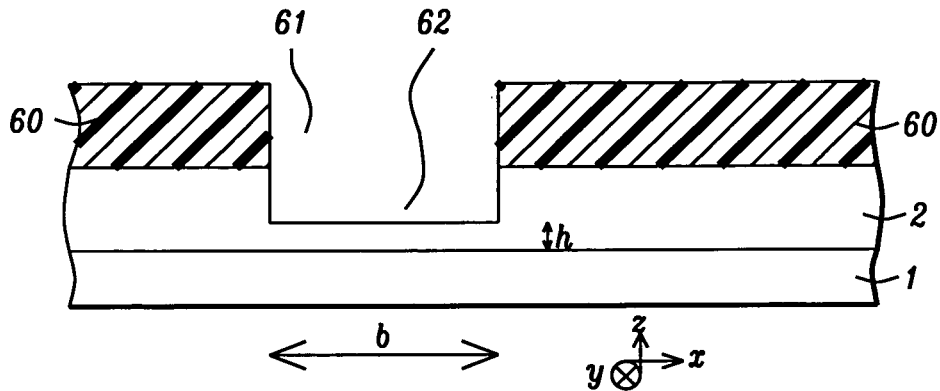
FIG. 2 is a cross-sectional view of an opening for a non-magnetic insertion layer formed in an insulation layer according to an embodiment of the present invention.

Referring to FIG. 2, a method of forming a non-magnetic insertion layer according to the present invention is depicted. An insulation layer 2 is deposited on substrate 1 by a sputter deposition method or the like. Thereafter, a photoresist layer 60 is coated on insulation layer 2 and patterned to form an opening 61 in the photoresist layer that corresponds to the desired shape and size of the non-magnetic insertion layer to be formed in a subsequent step. Next, a reactive ion etch (RIE) process may be employed to transfer the opening 61 into the insulation layer 2 to form an opening 62 therein. Opening 62 has a length b along the x-axis. Note that a portion of insulation layer 2 having a thickness h remains between the opening 62 and the substrate 1.

Figure 3:
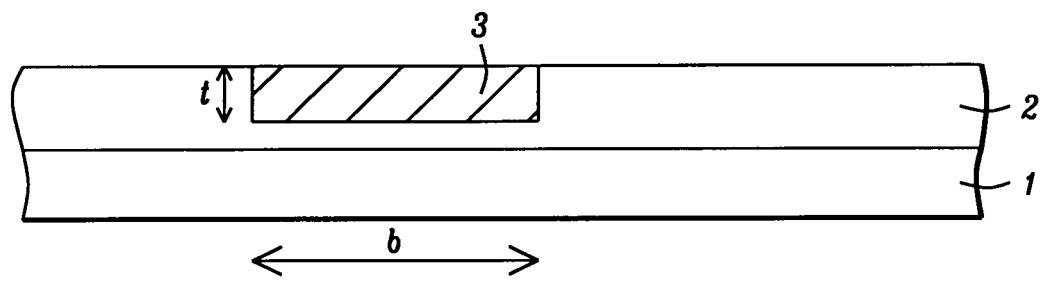
FIG. 3 is a cross-sectional view showing a non-magnetic insertion layer formed in the opening in FIG. 2 and planarized to be coplanar with the insulation layer.

Referring to FIG. 3, non-magnetic layer 3 may be deposited in the opening 62 by an electroplating process or by a sputter deposition process, for example. In one embodiment, a diffusion barrier layer and a seed layer (not shown) may be sequentially formed in the opening before depositing a Cu insertion layer 3. In the following step, a CMP process may be used to planarize the insertion layer 3 and make the insertion layer coplanar with the insulation layer 2. The thickness t of insertion layer 3 is preferably 1 to 5 microns.

Figure 4:
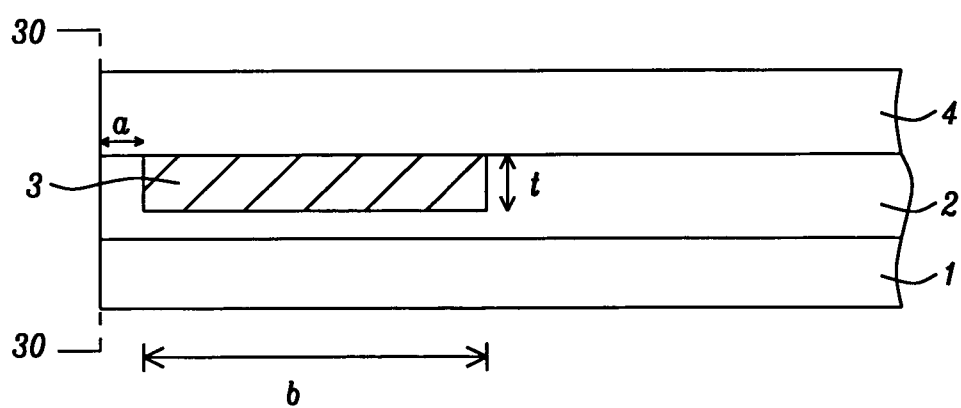
FIG. 4 depicts a portion of the completed read head after the first shield and overlying layers (not shown) are formed on the non-magnetic insertion layer in FIG. 3 and a lapping process is used to form an ABS.

Referring to FIG. 4, the S1 shield 4 is formed on the insulation layer 2 and non-magnetic insertion layer 3 by a conventional method. Likewise, the remainder of layers 5-29 in the read/write head shown in FIG. 1 are formed by well known methods that are not described herein. Thereafter, the read/write head is lapped such that the non-magnetic insertion layer 3 is recessed a distance a of about 0.3 to 10 microns from the resulting ABS 30-30. The length b along an axis perpendicular to the ABS is between 1 and 100 microns.

To quantify the effectiveness of the novel read/write head structure having a non-magnetic insertion layer formed below the S1 shield, a finite element model (FEM) simulation was performed with regard to an embodiment of the present invention where the non-magnetic insertion layer 3 is Cu, the bucking coil layer 12 has four turns, and the main coil 24 has four turns. The FEM simulation also takes into account that insulation layers 11, 25 are comprised of a photoresist layer which has a high CTE.

Figure 5:
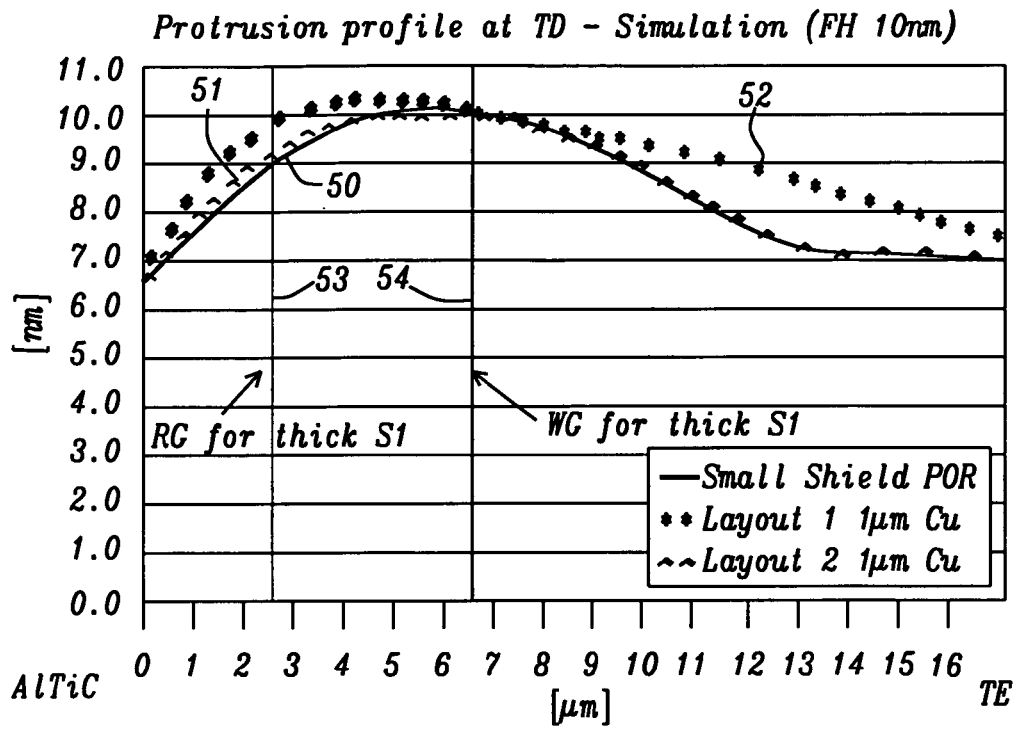
FIG. 5 is a graph showing simulation results of protrusion profile at touchdown for a reference design and two designs where a 1 micron thick Cu insertion layer having a width of about 30 microns or 100 microns is inserted in an insulation layer below the S1 shield according to embodiments of the present invention.

Referring to FIG. 5, the results of a first FEM simulation are shown in a plot of protrusion profile at touchdown (TD) for a fly height (FH) of 10 nm. The protrusion amount in nm is on the y-axis and the position in microns between the AlTiC substrate and trailing edge (TE) is shown along the x-axis. S1 shield thickness is 2 microns and the recessed distance of the non-magnetic insertion layer from the ABS is set at 0.6 microns in this case. Two insertion layer layouts with different size are compared with a reference design represented by curve 50 (solid line) where no insertion layer is employed. Curve 51 represents the protrusion profile for layout 2 where the Cu insertion layer is 1 micron thick and has a length along the x-axis of 100 microns. Curve 52 represents the protrusion profile for layout 1 where the Cu insertion layer is 1 micron thick and has a length along the x-axis of 30 microns. In this simulation, the heating element is placed at the position represented by heater 17 in FIG. 1.

Improved RG protrusion at touchdown DFH power is observed for both layouts (curves 51, 52) compared with the reference structure (curve 50). However, a larger Cu insertion layer layout (curve 51) provides a smaller RG protrusion than the smaller Cu insertion layout (curve 52) mainly due to higher volume that leads to excessive heat sink capacity. As a result, the DFH temperature rise is significantly reduced for layout 2 as shown in the bottom row of Table 1.

TABLE 1

Results for Cu insertion layouts below S1 shield

| Configuration | RG Efficiency [nm/100 mW] | RG Gamma Ratio | Max. DFH temp. rise [° C.] |
| --- | --- | --- | --- |
| POR (Reference) | 17 | 0.92 | 147 |
| Layout 1 (1 um thick Cu insertion layer) | 18.8 | 0.963 | 144 |
| Layout 1 (3 um thick Cu insertion layer) | 21.7 | 1.00 | 144.4 |
| Layout 2 (1 um thick Cu insertion layer) | 15.2 | 0.95 | 122 |

In addition to RG efficiency shown in terms of protrusion in nanometers per 100 mW of applied power, RG gamma ratio (to WG) is listed in Table 1 along with the maximum DFH temperature rise. Two important benefits of the non-magnetic insertion layer of the present invention are provided by the embodiment described as layout 1 that has a higher RG efficiency and higher RG gamma ratio compared with the reference design. Although layout 2 gave a higher gamma ratio than the reference, RG efficiency was degraded because of the large heat sink capacity due to the large volume of the Cu insertion layer which has a 100 micron length compared with a 30 micron length in layout 1. The layout 2 result may not be desirable for the drive integrator since higher power is needed for touchdown and operation which goes against the requirement for lower power consumption in mobile hard disk drives (HDD). Furthermore, layout 2 induced much higher isothermal pole tip protrusion (PTP) in the write head compared to layout 1 because of its much larger volume. Thus, layout 1 is the preferred design by, affording improved RG efficiency, higher RG gamma ratio, and a reduced Iw induced PTP compared with the reference while maintaining a reasonable isothermal PTP.

Referring again to FIG. 5, RG protrusion is related to the intersection of the curves 50-52 with the vertical line 53 representing RG for a thick S1 layer. Write pole tip protrusion (PTP) is related to the intersection of the curves 50-52 with the vertical line 54 representing WG for a thick S1 layer. In this calculation, S1 is assigned a thickness of 2 microns. Layout 1 with a 3 um thick Cu insertion layer showed a significantly improved RG efficiency and a RG gamma ratio of approximately 1.0 compared with the WG gamma ratio. In other words, WG protrusion rate/RG protrusion rate is at the ideal value of 1.0.

Figure 6:
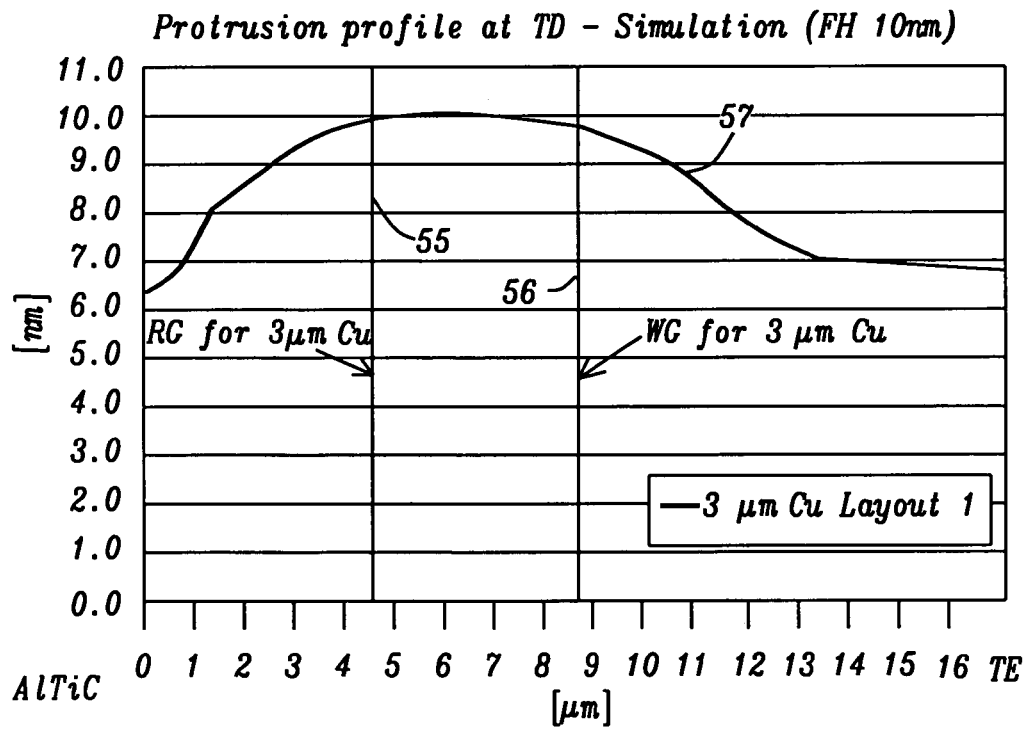
FIG. 6 is a graph showing simulation results of protrusion profile for a 3 micron thick insertion layer formed in an insulation layer below a S1 shield in a read head according to one embodiment of the present invention.

Referring to FIG. 6, the protrusion profile for layout 1 with a 3 micron thick Cu insertion layer is illustrated and is considered to be nearly optimal in view of the backend behavior. WS is the minimum (MIN) fly point with a step delta between WS and RG of 0.5 nm as the target for backend processing. In particular, touchdown clearance for RG (intersection of curve 57 with vertical line 55) is only slightly higher than for WG (intersection of curve 57 with vertical line 56) so the performance is enhanced. Note that RG is not the touchdown point to reduce the possibility of reader degradation. As a result, the best dynamic performance for a given spacing target has been achieved which means a smaller difference in RG, WG, and the minimum flying point can be obtained at touchdown detection compared to prior art read head configurations.

Thus, RG efficiency and RG gamma ratio has been improved over the prior art by implementing a non-magnetic insertion layer in an embodiment represented by layout 1. The present invention also encompasses other embodiments where the design of a non-magnetic insertion layer as described herein can be modified with respect to pattern (layout) based on the requirement of a particular HDD application. For example, the thickness and length of the insertion layer 3 may be adjusted depending on the thickness and volume of adjacent layers such as the S1 shield 4 and gap layer 5. Furthermore, the non-magnetic insertion layer layout according to the present invention has an advantage over prior art designs because optimization of mechanical performance and quasi-static test (QST) performance can be separated to allow more flexibility in read head design.

Figure 7:
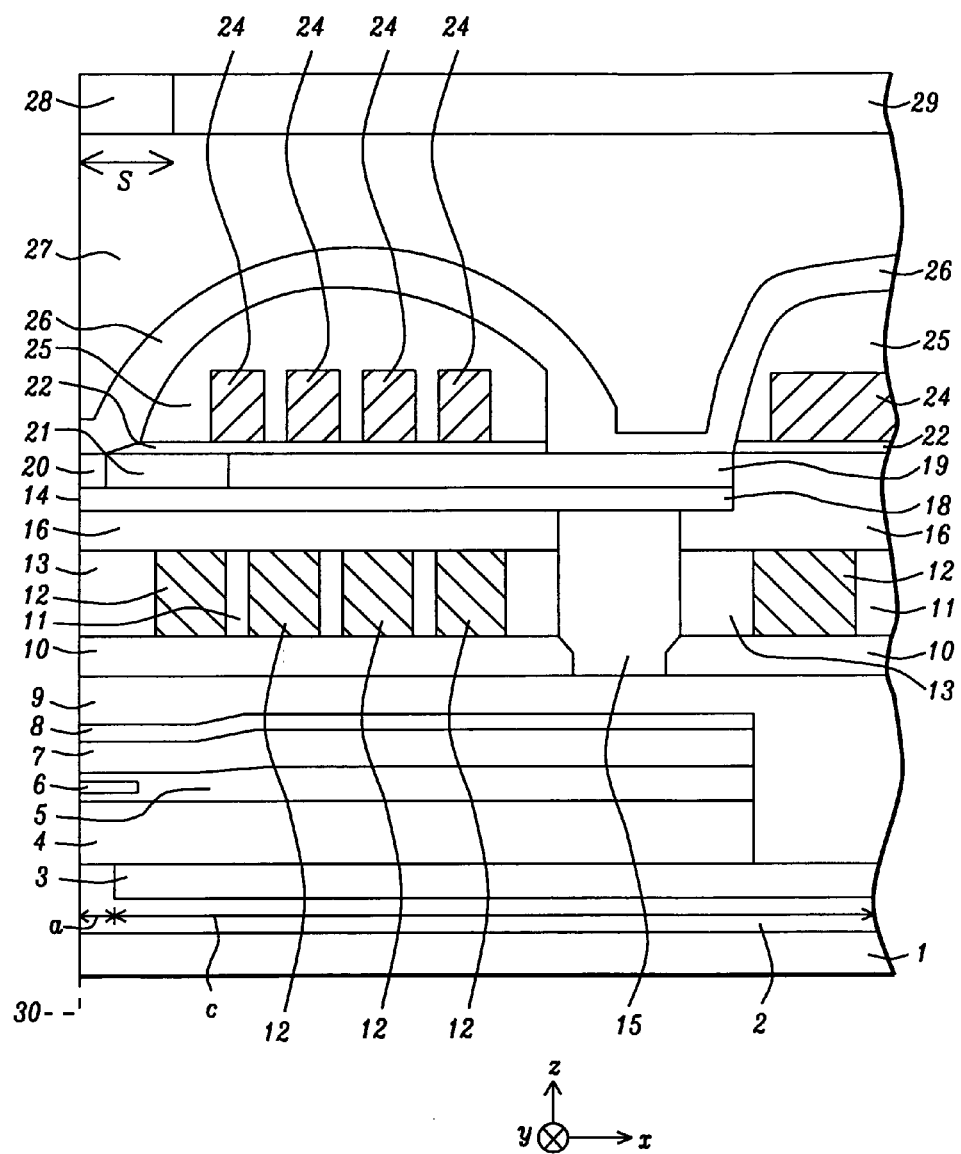
FIG. 7 is a cross-sectional view of a second embodiment wherein a non-magnetic insertion layer formed in an insulation layer below the S1 shield in a read head has a significantly larger volume than in the first embodiment in FIG. 1.

Referring to FIG. 7, an alternative embodiment is shown that represents a larger volume non-magnetic insertion layer represented by layout 2 in the aforementioned FEM simulations. In particular, the non-magnetic insertion layer 3 extends a greater distance c towards the back end of the device where c>b (FIG. 1).

While this invention has been particularly shown and described with reference to, the preferred embodiment thereof, it will be understood by those skilled in the art that various changes in form and details may be made without departing from the spirit and scope of this invention.

We claim:

1. A magnetic head comprised of a read head structure formed on a substrate and an overlying write head including a heating element formed on an opposite side of the read head structure with respect to the substrate, said read head structure comprises:
   (a) an insulation layer having a top surface and formed on the substrate, and with a side adjoining an air bearing surface (ABS);
   (b) a non-magnetic insertion layer formed in the insulation layer, said non-magnetic insertion layer is a metal or alloy and is recessed a certain distance from the ABS and has a top surface that is coplanar with the top surface of the insulation layer and contacts an overlying bottom (S1) shield, the non-magnetic insertion layer and other layers in the read head structure and write head expand toward a magnetic medium proximate to the ABS when heat is applied from the heating element wherein the ratio of write head expansion/read head expansion is controlled by a volume of the non-magnetic insertion layer; and
   (c) the bottom (S1) shield formed on the non-magnetic insertion layer and on a portion of the insulation layer.

2. The magnetic head of claim 1 wherein said non-magnetic insertion layer has a thickness of about 1 to 5 microns and has a length of about 1 to 100 microns along an axis that is perpendicular to the ABS.

3. The magnetic head of claim 1 wherein the read head structure includes a sensor with a non-magnetic layer that is comprised of a metal in a GMR scheme, or an insulation layer that is alumina or MgO in a TMR design.

4. The magnetic head of claim 1 wherein non-magnetic insertion layer is comprised of Cu or a Cu alloy.

5. The magnetic head of claim 1 wherein said non-magnetic insertion layer is recessed a distance of about 0.3 to 10 microns from the ABS.

6. The magnetic head of claim 1 wherein the non-magnetic insertion layer has a coefficient of thermal expansion (CTE) which is greater than the CTE of alumina.

7. The magnetic head of claim 1 wherein the non-magnetic insertion layer has a thermal conductivity greater than that of alumina to serve as a heat sink.

8. The magnetic head of claim 1 wherein the read head structure is further comprised of a stack of layers in which a gap layer having a sensor element therein adjacent to the ABS, a first upper (S2A) shield, a second insulation layer, and a second upper (S2B) shield are sequentially formed on the S1 shield layer.

9. The magnetic head of claim 8 wherein the upper (S2B) shield also represents a flux return pole in the write head.

* * * * *